United States Patent [19]

Smiley

[11] 4,164,757

[45] Aug. 14, 1979

[54] SYSTEM FOR COMMUNICATING A PERIODIC SIGNAL BY MEANS OF COHERENT MODULATION

[75] Inventor: Charles F. Smiley, Quincy, Ill.

[73] Assignee: Harris Corporation, Cleveland, Ohio

[21] Appl. No.: 850,930

[22] Filed: Nov. 14, 1977

[51] Int. Cl.$^2$ .................. H04N 5/04; H04N 5/26
[52] U.S. Cl. .................................. 358/149; 178/69.1
[58] Field of Search .................. 358/148, 149, 150; 325/65, 42; 178/69.1

[56] References Cited

U.S. PATENT DOCUMENTS 2,987,574  6/1961  Gatfield et al. .................. 358/148

Primary Examiner—Robert L. Richardson

[57] ABSTRACT

A system for communicating a periodic signal, such as a timing signal, over a relatively low frequency channel. The periodic signal is modulated (e.g. amplitude modulated) onto a low frequency carrier signal which is phase-locked with the periodic signal. Since the carrier is coherent with the periodic signal, phase jitter and other spurious variations, which would otherwise be present in the subsequently demodulated signal, are essentially eliminated. The system is described with specific reference to the communication of timing signals between a television camera head and a camera control unit. In the described system, coherence between the carrier signal and the timing signal is assured by using the carrier signal to clock the circuit which generates the timing signal.

12 Claims, 3 Drawing Figures

SYSTEM FOR COMMUNICATING A PERIODIC SIGNAL BY MEANS OF COHERENT MODULATION

BACKGROUND AND FIELD OF THE INVENTION

The present invention relates to the art of modulation systems, and more particularly to a system which communicates a periodic signal by modulating a carrier signal which is phase-locked to the periodic signal.

Amplitude modulation and similar forms of modulation such as double sideband, single sideband and vestigial sideband modulation are extensively used in radio broadcasting and other fields for communicating both the analog and digital signals. The fidelity of the signal being communicated is in large part determined by the frequency of the carrier signal upon which it is modulated.

Amplitude modulation, when used in conjunction with envelope detection, essentially involves the periodic sampling of the analog signal since the peak amplitude of each cycle of the carrier signal will "sample" the amplitude of the modulating function at that instant. Since this "sampling" is periodic, rather than continuous, however, those portions of the sampled function which occur between peaks of the carrier signal will be lost. If the carrier signal has a sufficiently high frequency, the modulating function will not change significantly between samples, and little modulating information will be lost. It is therefore necessary, if high fidelity is to be achieved, that the carrier signal be a high multiple (10 or greater) of the maximum frequency of the modulating signal.

Furthermore, if a periodic modulating signal (such as a timing signal) is employed, spurious variations will exist in the timing of the signal as subsequently demodulated. This is due to the "sampling" of the periodic signal at different times in different cycles. This is commonly referred to as phase jitter, and is particularly troublesome when the signal being transmitted is a timing signal since it is necessary to reduce the phase jitter of the timing signal to as small a degree as possible if precise timing is required. This again means the frequency of the carrier signal should be as high as possible.

The necessity for using high frequency carrier signals to communicate timing information can represent a significant constraint in some systems. One specific example relates to the field of television broadcasting. In order to synchronize the operation of the camera head with the network timing (commonly referred to as "house sync") it is necessary that very precise timing signals be communicated between the camera control unit and the camera head. When the camera control unit and the camera head are located quite close together, a multi-conductor cable can be provided so that each of the signals which must be communicated between the camera head and the camera control unit may be sent over a separate conductor. Thus, these timing signals may be sent to the camera head over a separate conductor. When a camera head is to be operated at a location which is quite distant from the camera control unit, however, it is desirable, both from a cost standpoint and ease of operation standpoint, that all signals be communicated over single length of flexible triaxial cable.

When only a single triax cable is used, the video signals are communicated between the camera head and the camera control unit in separate frequency channels. In view of the fact that as many as four video signals must be communicated over this cable, the frequency spectrum of the composite signal is quite broad. If an additional high frequency channel is allocated to the communication of one or more timing signals, then this spectrum must be extended even further. It is desirable, however, that the frequency spectrum be as limited as possible because of the nature of the attenuation characteristics of the triax cable. In view of this, it would be desirable to communicate the timing signal in a low frequency channel, since these channels cannot be used for the transmission of video signals due to the poor fidelity which would result therefrom. Due to the low frequency nature of the carrier signal, however, unacceptable phase jitter would accompany the transmission of the timing signals over these channels, if an envelope detector were used to recover the timing signals.

This problem could be largely avoided by using a synchronous detector, rather than an envelope detector, to recover the timing signals. This is because a synchronous detector is capable of recovering information from all parts of the modulated signal, and thus does not suffer from the sampling effects described previously. For many reasons (including cost and complexity), however, it would be desirable to avoid the use of a synchronous detector.

SUMMARY OF THE INVENTION

It has been found that periodic signals may be communicated over relatively low frequency modulated carrier signals, and acceptably recovered by even an envelope detector, if the carrier signal is coherent with the periodic signal. This is because the coherence of the carrier signal with the periodic signal serves to substantially eliminate phase jitter effects, as well as to eliminate other spurious variations in the additive noise in the modulated signal which is coherent with the periodic signal. In the television broadcasting example referred to above, it has been found that the timing signals which must be communicated between the camera control unit and the camera head may be modulated onto a relatively low frequency coherent carrier signal while still allowing the recovery of a precise and well-defined timing signal at the place of utilization.

In accordance with the present invention, a system is provided for communicating a periodic timing signal from a first station to a second station. The system includes a coherent carrier generator which produces a carrier signal which is phase-locked with the periodic timing signal. A modulator is provided for modulating the coherent carrier signal in accordance with the periodic timing signal. The resulting modulated signal is communicated to the second station, where it is demodulated to recover the periodic signal.

BRIEF DESCRIPTION OF THE DRAWINGS

The foregoing and other objects and advantages of the present invention will become more readily apparent from the following description of a preferred embodiment, as taken in conjunction with the accompanying drawings which are a part hereof and wherein.

DETAILED DESCRIPTION

The following detailed description of the present invention will be described with reference to the field of television broadcasting. It will be understood, however, that the invention has broader application to the communication of periodic signals, in general, and is not limited to the specific field with which it is described.

In this description, there will be the occasional need to refer to the relationship between periodic signals of differing frequencies. When no special relation exists between the signals, they will be said to be non-coherent, or not in phase synchronism. When the frequencies of the two signals are synchronized in a harmonic relationship, however, they will be referred to as coherent, or phase synchronized. "Phase synchronism", as this term is used herein, will thus be understood to mean that the signals are synchronized so that any selected phase angle of the lower frequency signal will always coincide in time with a specific phase angle of the higher frequency signal. Phase synchronism does not require, however, that the zero crossings of the lower frequency signal coincide with zero crossings of the higher frequency signal.

Figure 1:
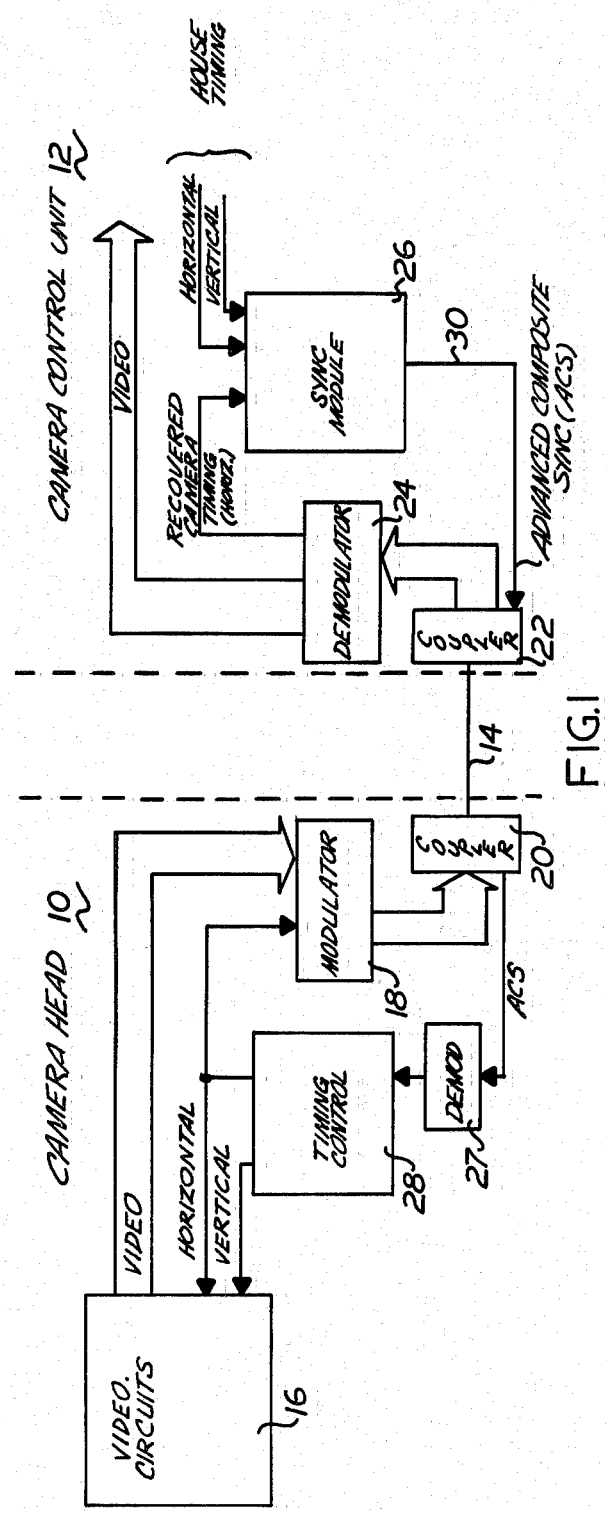
FIG. 1 is a block diagram broadly illustrating a triax system for use in television camera systems.

There is illustrated in FIG. 1 a triax communication system wherein a camera head 10 is coupled to a camera control unit 12 by means of single length of triax cable 14. At the camera head, a video circuit 16 generates three video signals (blue, green and red) which must be communicated to the camera control unit. These video signals are supplied to an interface circuit 18. In this circuit, each video signal is modulated onto a separate carrier signal so that each video signal is translated in frequency into a separate frequency channel. In addition, a horizontal timing signal which clearly defines the timing of the video signals is also directed to the modulator. This signal may also be modulated onto a separate carrier signal, or it may alternatively be combined in some manner with one of the video signals so as to conserve system band width. These frequency-translated signals are then directed to a coupling network 20 which, essentially, adds them together to form a single composite signal which is then transmitted to the camera control unit via the triax cable 14.

At the camera control unit 12, a second coupler 22 is provided which separates the various frequency channels of the composite signal and provides them separately to an interface 24. Interface 24 includes separate demodulators for recovering each of the video signals, and provides the recovered signals at the output thereof.

In order to synchronize the horizontal and vertical timing of the video circuit 16 at the camera head with the house timing of the camera control unit, a phase locked loop arrangement is utilized. Elements of the loop include a synchronizing module 26 located at the camera control unit, and a timing control circuit 28 located at the camera head. The synchronizing module 26 receives the house sync signals in the form of horizontal and vertical timing signals. Sync module 26 also receives the timing signal which has been transmitted from the camera head to the camera control unit. Since the timing of this recovered camera timing signal reflects the timing of the recovered video signal the video signals will be synchronized with the house sync when the recovered camera timing signal is. Responsive to these signals, sync module 26 generates an advanced composite sync (ACS) signal which is modulated unto a carrier signal so as to place it in a separate frequency channel.

In accordance with the present invention, sync module 26 serves to modulate the sync signal unto a low frequency, but coherent, carrier signal.

The ACS signal is output on an output line 30, and coupled onto triax cable 14 via coupler 22. This modulated ACS signal is decoupled from triax cable 14 by means of coupler 20, and is supplied to a demodulator 27, where the ACS signal is recovered from the carrier. The recovered ACS signal is then sent to a timing control circuit 28, where it is separated into separate vertical and horizontal timing signals. These signals are supplied to video circuit 16, where they control the systems which generate the video signals. These video signals will thus be synchronized with the vertical and horizontal timing signals. As stated previously, the horizontal timing signal derived by timing control 28 is also sent back to the camera control unit, along with the video signals, so as to provide a signal which clearly defines the timing of the video signal.

The timing of the video signals recovered at the camera control unit 10 is adjusted by sync module 26. This module detects differences between the timing of the video signals (as indicated by the recovered camera timing signal) and adjusts the phase of the ACS signal in the direction necessary to appropriately advance or retard the timing of the video signals. As described previously, the camera timing signals are directly derived from this ACS signal, as recovered at the camera head.

The accuracy of the camera timing will be largely dependent upon the preciseness with which the ACS signal can be communicated back to the camera head. If conventional AM techniques are used, however, the recovered ACS signal will be corrupted by phase jitter.

Figure 2:
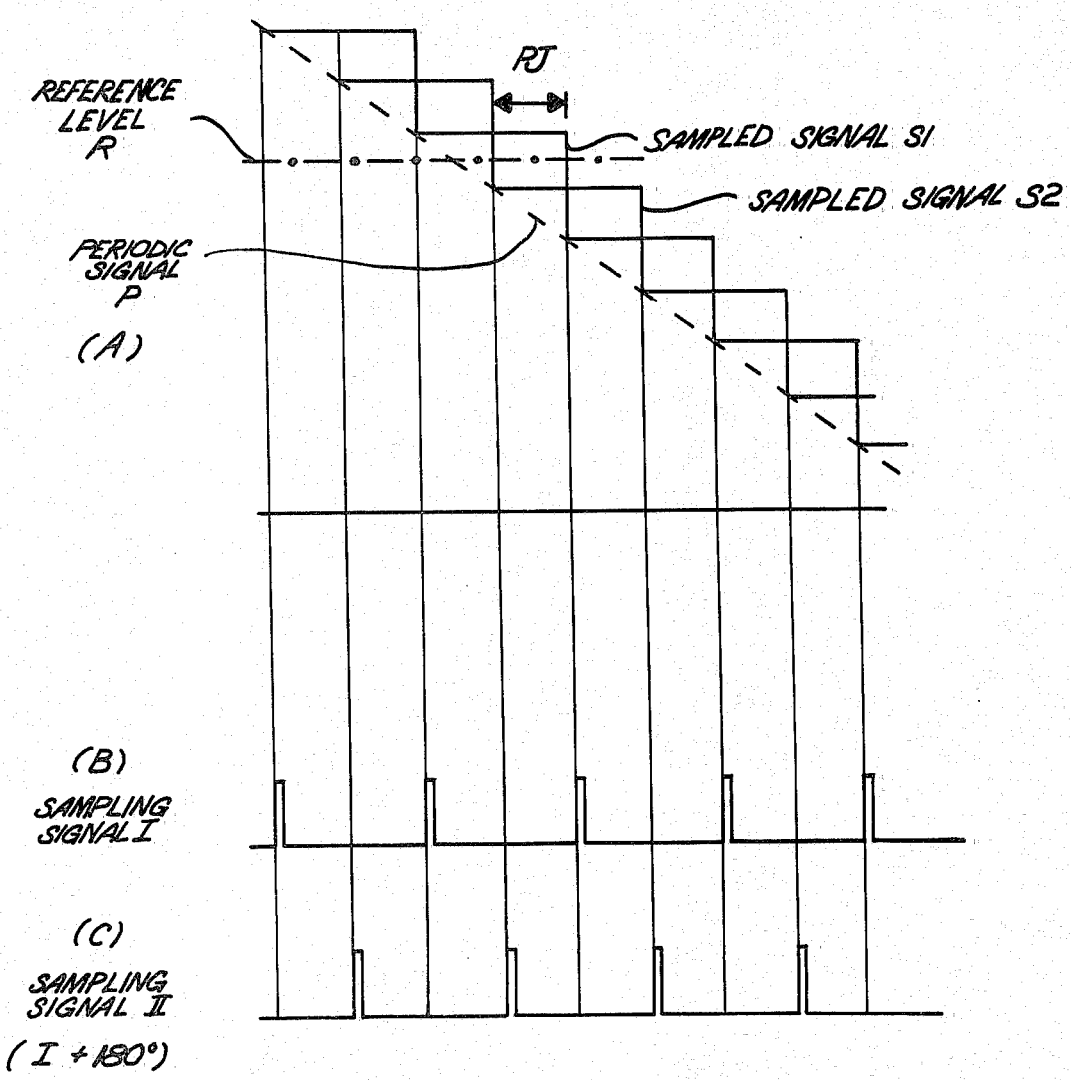
FIG. 2 is a graphical illustration of phase jitter.

Phase jitter is produced when a periodic signal, such as a timing signal, is modulated and then demodulated using conventional modulation techniques in conjunction with certain demodulation techniques, e.g. envelope detection. This is illustrated graphically in FIG. 2. In order to simplify the description which follows, the modulation/demodulation system will be characterized as a pure sampling system. In FIG. 2(a), a portion of one cycle of a periodic modulating signal P is shown. Two different phases of the sampling signal (which corresponds to the carrier signal of an AM scheme) are shown in FIGS. 2(b) and 2(c). Since conventionally the periodic signal P and the sampling signal are non-coherent, i.e. not in phase synchronism, the relative phase between the two signals will change with time. The relative phases of the signals will at one time be as indicated in FIG. 2(b), and at another time as indicated in FIG. 2(c). The sampled signals resulting from these two phases are indicated in FIG. 2(a) at S1 and S2. It will thus be seen that the time at which the sampled periodic signal passes through a reference level (R) may vary by as much as PJ. This spurious variation is known as phase jitter.

Conventionally, the problem of phase jitter would be solved by increasing the frequency of the carrier signal. In the case of the described triax system, however, the band-width occupied by other signals, mainly the video signals, is already very broad. This may extend, for example, from 6 MHz to over 55 MHz. Because of the frequency characteristics of the triax cable it would be undesirable to extend it further by adding another high frequency channel. Although lower frequency channels (1-5 MHz) are available, the transmission of a composite sync signal through these channels would introduce significant phase jitter, since the frequency spectrum of the sync signal is approximately 800 KHz wide.

The present invention resolves this problem by modulating the timing signal onto a carrier signal which is synchronized in phase with the timing signal. Since the timing signal is then "sampled" at the same time in each cycle, phase jitter is essentially eliminated. This means that the timing signal may be transmitted in a lower frequency channel while still allowing a very well defined noise free timing signal to be recovered by the camera head demodulator 27.

Figure 3:
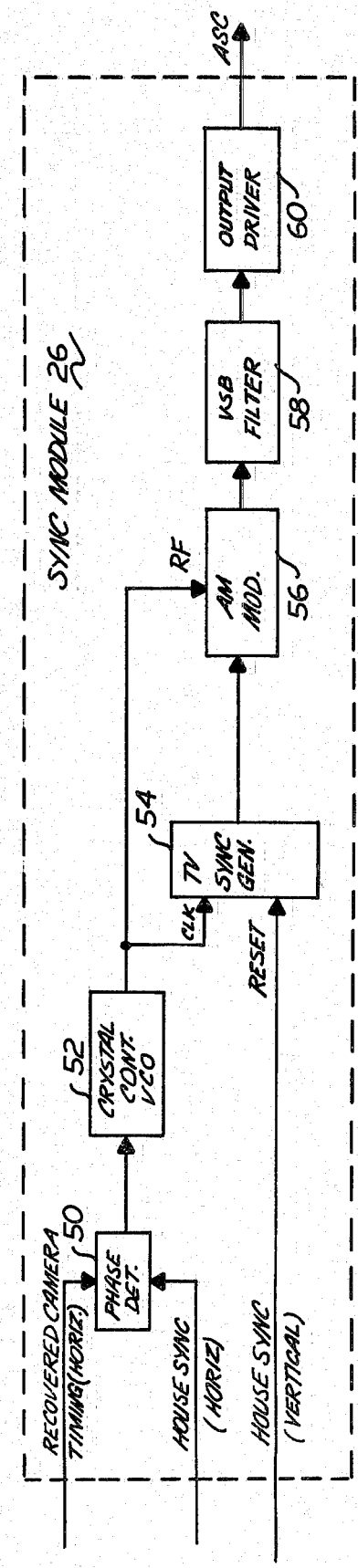
FIG. 3 is a more detailed block diagram of the coherent carrier modulation scheme utilized in the system of FIG. 1.

In FIG. 3 there is illustrated one form which sync module 26 could take in accordance with the present invention. In this figure it will be seen that a phase detector 40 is provided which responds to the recovered horizontal timing signal and to the horizontal house sync to provide an analog output signal which indicates the phase difference between these two signals. This analog output signal is used for controlling the frequency of operation of voltage controlled oscillator (VCO) 52. VCO 52 will preferably be crystal controlled, with a frequency control input for allowing slight variations around the crystal controlled frequency. This may be accomplished by connecting a varactor diode (voltage controlled capacitor) across the crystal, and utilizing the output of phase detector 50 to control the bias voltage applied to the varactor. In the example being illustrated, voltage control oscillator 52 has a mean frequency of 2.04545 MHz, and serves as the carrier signal upon which the synchronizing signal is modulated. In order to phase-lock the synchronizing signal with this carrier signal, the output of voltage controlled oscillator 52 is utilized as the clock input to a conventional TV sync generator 54.

TV sync generator 54 may be of conventional construction, and includes two inputs. One input, provided by voltage controlled oscillator 52, serves to clock the internal circuitry of the generator so as to control the generation of the composite sync signal provided at the output thereof. The second input, derived from the house vertical sync signal, resets the TV sync generator at the beginning of the synchronizing pattern. Thus, the vertical portion of the composite sync signal generated by TV sync generator 54 will be synchronized with the house vertical sync signal. Furthermore, since the clocking of the TV sync generator 54 is controlled by the output of voltage controlled oscillator 52, the horizontal timing of the composite sync signal generated by TV sync generator 54 will be phase-locked with the operation of VCO 52.

A conventional amplitude modulator 56 receives an RF carrier signal from the voltage controlled oscillator 52, and a periodic timing signal (i.e. the composite sync signal) from TV sync generator 54. Modulator 56 amplitude modulates the RF signal in accordance with the periodic timing signal and provides the output to vestigial side band filter 58. This filter predistorts the modulator timing signal by filtering out one of the sidebands so that the band width occupied by the remaining signal is reduced. The output of filter 58 is provided to coupler 22 (FIG. 1) via an output driver 60 of conventional construction.

It will be appreciated that the system which has been described amplitude modulates a periodic timing signal onto a relatively low frequency carrier signal which is coherent with the periodic timing signal. Because of this coherence, the advanced composite signal provided at the output of output driver 60 will introduce substantially no phase jitter into the timing signal as subsequently recovered by demodulator 27. In addition to eliminating phase jitter, the described technique also eliminates spurious variations in noise components of the recovered timing signal which are synchronized with the periodic timing signal. These noise components are introduced by additive noise in the modulated signal, which may be due to the operation of such other elements of the system as chopper power supplies.

Although the invention has been described with respect to a preferred embodiment, it will be appreciated that various rearrangements and alterations of parts may be made without departing from the spirit and scope of the invention, as defined in the appended claims. Additionally, it will be recognized by those skilled in the art that, although described with respect to amplitude modulation and envelope detection, the technique is equally applicable to other forms of modulation and demodulation, as well. It is thus intended that the invention apply to other, similar sampling approaches, pulse modulation techniques, etc.

What is claimed is:

1. Apparatus for generating a periodic signal and for communicating said signal from a first station to a second station, comprising means located at said first station for generating said periodic signal and a carrier signal such that said carrier signal has a frequency which is a fixed multiple of the frequency of said periodic signal, and that said carrier signal bears a substantially fixed phase relationship to said periodic signal, means for modulating said carrier signal in accordance with said periodic signal to provide a modulated carrier signal, means for communicating said modulated carrier signal from said first station to said second station, and means located at said second station for demodulating said modulated carrier signal so as to recover said periodic signal therefrom, whereby said recovered periodic signal has a reduced noise component due to the coherence of said carrier signal with said periodic signal.

2. Apparatus as set forth in claim 1 wherein said modulating means comprises means for modulating the amplitude of said carrier signal in accordance with said periodic signal.

3. Apparatus as set forth in claim 2, wherein said means for demodulating said modulated carrier signal comprises means for detecting the envelope of said modulated carrier signal.

4. Apparatus as set forth in claim 1 wherein said signal generating means comprises means for generating said carrier signal and means responsive to said carrier signal for generating said periodic signal in synchronism therewith.

5. In a system wherein a first station communicates a cyclical signal to a second station, apparatus for synchronizing the timing of said cyclical signal with the timing of a first periodic reference signal at said second station, comprising: phase detector means at said second station responsive to said cyclical signal and to said first periodic reference signal for providing an output signal indicating the phase difference therebetween; signal generating means at said second station for generating a second periodic reference signal and for adjusting the phase of said signal in accordance with said output signal provided by said phase detector means; modulating means at said second station for modulating said second periodic reference signal onto a carrier signal also generated by said signal generating means, so as to produce a modulated signal; means for communicating said modulated signal from said second station to said first station; means at said first station for demodulating said modulated signal so as to recover said second periodic timing signal therefrom; and, means at said first station for synchronizing said cyclical signal with said recovered periodic timing signal; wherein said signal generating means generates said second periodic timing signal and said carrier signal so that said signals are in phase synchronism with one another, whereby said recovered periodic signal has a reduced noise component due to the coherence of said signals.

6. Apparatus as set forth in claim 5 wherein said signal generating means includes means for generating said carrier signal and for adjusting the phase thereof in accordance with said phase detector output signal, and means for deriving said second periodic reference signal from said carrier signal whereby said carrier signal and said second periodic reference signal will be in phase synchronism with one another.

7. Apparatus as set forth in claim 5 wherein said modulating means comprises means for modulating the amplitude of said carrier signal in accordance with said second periodic reference signal, and wherein said means for demodulating said modulated signal comprises means for detecting the envelope of said modulated signal so as to recover said second periodic reference signal therefrom.

8. In a television camera system wherein a camera head communicates video signals to a control station, apparatus for synchronizing the timing of said video signals with the timing of a video sync signal at said control station, comprising: phase detector means at said control station responsive to the timing of said video signals for comparing said timing of said video signals to the timing of said video sync signal and for providing an output signal indicating the phase difference therebetween; signal generating means for generating a return video sync signal and for adjusting the phase of said signal in accordance with said phase detector output signal; modulating means at said control station for modulating said return video sync signal onto a carrier signal also generated by said signal generating means, so as to produce a modulated signal; means for communicating said modulated signal to said camera head from said control station; means at said camera head for demodulating said modulated signal so as to recover said return video sync signal therefrom; and, means at said camera head for synchronizing said video signals with said return video sync signal thus recovered; wherein said signal generating means generates said return video sync signal and said carrier signal so that said signals are in phase synchronism with one another, whereby said return video sync signal recovered by said demodulating means has a reduced noise component because of the coherence of said signals.

9. Apparatus as set forth in claim 8, wherein said signal generating means includes means for generating said carrier signal, means for deriving said return video sync signal from said carrier signal whereby said carrier signal and said return video sync signal will be in phase synchronism with one another, and means for adjusting the phase of said carrier signal in accordance with said phase detector output signal.

10. Apparatus as set forth in claim 9 wherein said means for deriving said return video sync signal from said carrier signal comprises means responsive to a clock signal at a clock input for generating a composite video sync signal in synchronism therewith, said composite video sync signal serving as said return video sync signal, and means for coupling said carrier signal to said clock input for providing a clock signal thereto.

11. Apparatus as set forth in claim 8 and further comprising a vestigial sideband filter at said control station for filtering said modulated signal, prior to communication of said signal to said camera head, so as to narrow the frequency bandwidth occupied thereby.

12. Apparatus as set forth in claim 8 wherein said modulating means comprises means for modulating the amplitude of said carrier signal in accordance with said return video sync signal, and wherein said means for demodulating said modulated signal comprises means for detecting the envelope of said modulated signal so as to recover said return video sync signal therefrom.

* * * * *